United States Patent [19]

Lundeen et al.

[11] Patent Number: 5,236,998
[45] Date of Patent: Aug. 17, 1993

[54] PROCESS FOR THE MANUFACTURE OF LINEAR POLYETHYLENE CONTAINING α-ALKENE COMMONOMERS

[75] Inventors: Allan J. Lundeen, Houston; James E. Feig, Victoria, both of Tex.

[73] Assignee: Occidental Chemical Corporation, Niagara Falls, N.Y.

[21] Appl. No.: 897,645

[22] Filed: Jun. 11, 1992

Related U.S. Application Data

[63] Continuation-in-part of Ser. No. 665,872, Mar. 7, 1991, abandoned.

[51] Int. Cl.⁵ .................... C08L 23/06; C08L 23/08
[52] U.S. Cl. .................................... 525/52; 525/53; 525/54; 525/193; 525/240; 525/320; 525/324
[58] Field of Search ................ 525/52, 53, 54, 193, 525/240, 320, 324

[56] References Cited

U.S. PATENT DOCUMENTS

| | | | |
|---|---|---|---|
| 4,269,948 | 5/1981 | Nicco | 525/53 |
| 4,874,820 | 10/1989 | Cozewith et al. | 525/53 |
| 4,975,485 | 12/1990 | Sato et al. | 525/53 |

*Primary Examiner*—Joseph L. Schofer
*Assistant Examiner*—R. H. Delmendo
*Attorney, Agent, or Firm*—Wayne A. Jones; Richard D. Fuerle; Arthur S. Cookfair

[57] ABSTRACT

A process for making a blend of high-density polyethylene polymers containing one or more C3 to C12 α-olefin comonomers. The process begins in two parallel streams. In one stream ethylene is polymerized alone, and in the second stream ethylene is polymerized with the comonomer(s). The two streams are combined in a subsequent reactor where the polymerization process is completed. The polymerization produces a polymer wherein the comonomer is concentrated in the higher molecular weight fractions.

20 Claims, 3 Drawing Sheets

FIG. I

PROCESS FOR THE MANUFACTURE OF LINEAR POLYETHYLENE CONTAINING α-ALKENE COMONOMERS

BACKGROUND OF THE INVENTION

This application is a continuation-in-part of application Ser. No. 07/665,872, filed Mar. 7, 1991, and now abandoned.

This invention relates to a process for producing a blend of polyethylene and linear copolymers of ethylene and α-alkene comonomers. More particularly, this invention relates to a three stage high temperature solution process for the polymerization of ethylene with alkene comonomers. The polymer blend produced by this process can be used for a wide variety of applications including plastic sheeting material, plastic containers, and pipes.

It is known in the art to conduct polymerizations in stages using two or more reactors in series. Such a polymerization configuration is illustrated in FIG. 1. Several examples of such processes are disclosed in the recent patents cited below.

Japanese Patent Application number 82-225584 (as abstracted in CA101:152524r and Derwent acc. #84-199031/32) discloses a polymerization process in which ethylene is first polymerized in the presence of a Ziegler-type catalyst. In the second step, ethylene is copolymerized with a larger olefin. Different proportions of hydrogen are used in the two reactions and the molecular weights of the polymers produced differs.

Japanese Patent Application number 81-105667 (as abstracted in CA99:38939v) discloses a two-stage polymerization in which ethylene and C5 to C15 α-olefins are polymerized in a hydrocarbon solvent in the first stage and, in the second stage, the solvents are removed and ethylene is copolymerized in a gas phase process with C3 to C4 α-olefins.

Russian Patent Application number SU71-1701018 (as abstracted in CA91:5691q) discloses a two-stage polymerization process in which ethylene is copolymerized with other α-olefins in the presence of a Ziegler catalyst under suspension conditions and then, in the second step, under solution polymerization conditions.

U. S. Pat. No. 4,814,377 discloses a two-step process for the formation of polyethylene containing a comonomer in which at least one C2 to C6 α-olefin is polymerized to produce a granular polymer matrix/catalyst mixture; the portion of this mixture is removed from the first reactor and is treated with a liquid α-olefin or diolefin comonomer having at least seven carbon atoms in an amount sufficient to at least partially coat the polymer matrix. This liquid olefin coated polymer matrix/catalyst mixture is conducted to either the first reactor, or to a second reactor, where it reacts further with at least one unreacted α-olefin having two to six carbon atoms.

Japanese Patent number 63-230718 (as abstracted in CA110:115555s) discloses a process for the preparation of ethylene α-olefin copolymers in which the mixture of ethylene and C3 to C18 α-olefins is exposed to Ziegler catalysts in a multi-stage reactor. The reactor stages differ in temperature from one another.

Japanese Patent Application number JP 85-46476 (as abstracted in Derwent—accession #86-282554/43) discloses the preparation of modified polyethylene by the polymerization of ethylene or copolymerization of ethylene with α-olefins in the presence of a Ziegler catalyst by a multi-stage process with steps H, L, and M, which can be run in any order. Optionally, the H and L steps can be run simultaneously followed by mixing the reaction products of each step and subjecting this product mixture to the M step. The final step of the process involves exposing the polyethylene powder produced to a radical generator. The H step involves preparing 20 to 40 wt % of the whole polymerization amount of a polyethylene having an intrinsic viscosity of 5 to 20 and 20 wt % or less of α-olefin content. The L step involves preparing 20 to 70 wt % of the whole polymerization amount of a polyethylene having an intrinsic viscosity of 0.2 to 1.0, and 10 wt % or less α-olefin content, and the M step involves preparing 20 to 70% of the whole polymerization amount of a polyethylene having 1 to 5 intrinsic viscosity and 20 wt % or less α-olefin content.

The rate of polymerization of ethylene is much higher than the rates of polymerization of higher α-olefins. ("Ziegler-Natta Catalysts and Polymerization," John Boor, Academic Press, NY 1979, p. 505) The reactivity ratio of ethylene to propylene is about 100, and the ratio increases for higher olefins. Accordingly, in any polymerization in a plug-flow (non-back mixed) reactor involving ethylene and a higher α-olefin comonomer, the ethylene will tend to polymerize more rapidly, and the comonomer will be introduced into the chain to a greater extent as the ethylene concentration is depleted. As a result, the comonomer is preferentially incorporated into polymer chains produced later in the process. The later portions of the polymerization process tend to be operated at higher temperatures, and such higher temperature processes produce lower molecular weight chains. Accordingly, the comonomer tends to incorporate preferentially into the chains of lower molecular weight. However, it is known that comonomers have a desirable effect on polymer properties when they are incorporated into the higher molecular weight chains.

SUMMARY OF THE INVENTION

According to the present invention, a high temperature solution process is provided for the polymerization of ethylene and one or more C3 to C12 α-olefin comonomers. This process begins with two parallel polymerization process streams. In one stream ethylene is polymerized with the comonomer(s) at relatively low temperatures and, in the second stream, ethylene is polymerized alone at a higher temperature. The two streams are combined and fed to a subsequent tubular, non-back mixed reactor where unreacted monomer polymerizes at a still higher average temperature. This polymerization process produces a polymer blend having three fractions where the comonomer is concentrated in the higher molecular weight fraction.

Ethylene, solvent, catalyst, comonomer, and possibly hydrogen are charged into Reactor I. Ethylene, solvent, catalysts, and possibly hydrogen are charged into Reactor II. The outputs of Reactor I and II are combined and placed into Reactor III. The output of Reactor III goes to stage 4, that is, the product recovery system.

Figure 3:
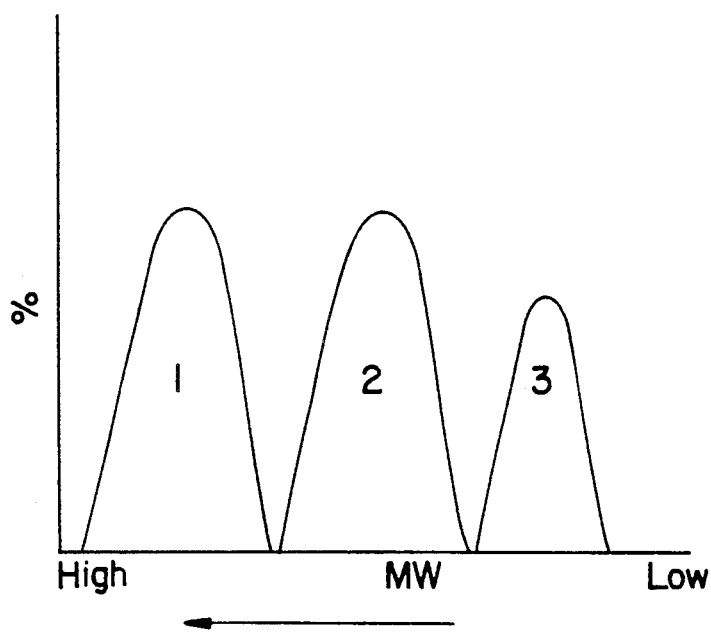

FIG. 3 is a diagram that shows the three components of the polymer blend product of this invention.

DETAILED DESCRIPTION OF THE INVENTION

It is an object of the present invention to provide a high temperature solution process for the copolymerization of ethylene and one or more C3 to C12 α-olefin comonomers in which the comonomer(s) tends to be incorporated into the higher molecular weight polymer chains. In addition, the process of the present invention utilizes comonomer more efficiently than other polymerization processes. Thus, less comonomer is required to produce an equivalent change in the polymer properties. It is a particular advantage of the present process that the polymer produced has better resistance to environmental stress cracking than does a polymer produced in a conventional linear series of reactors.

Figure 2:
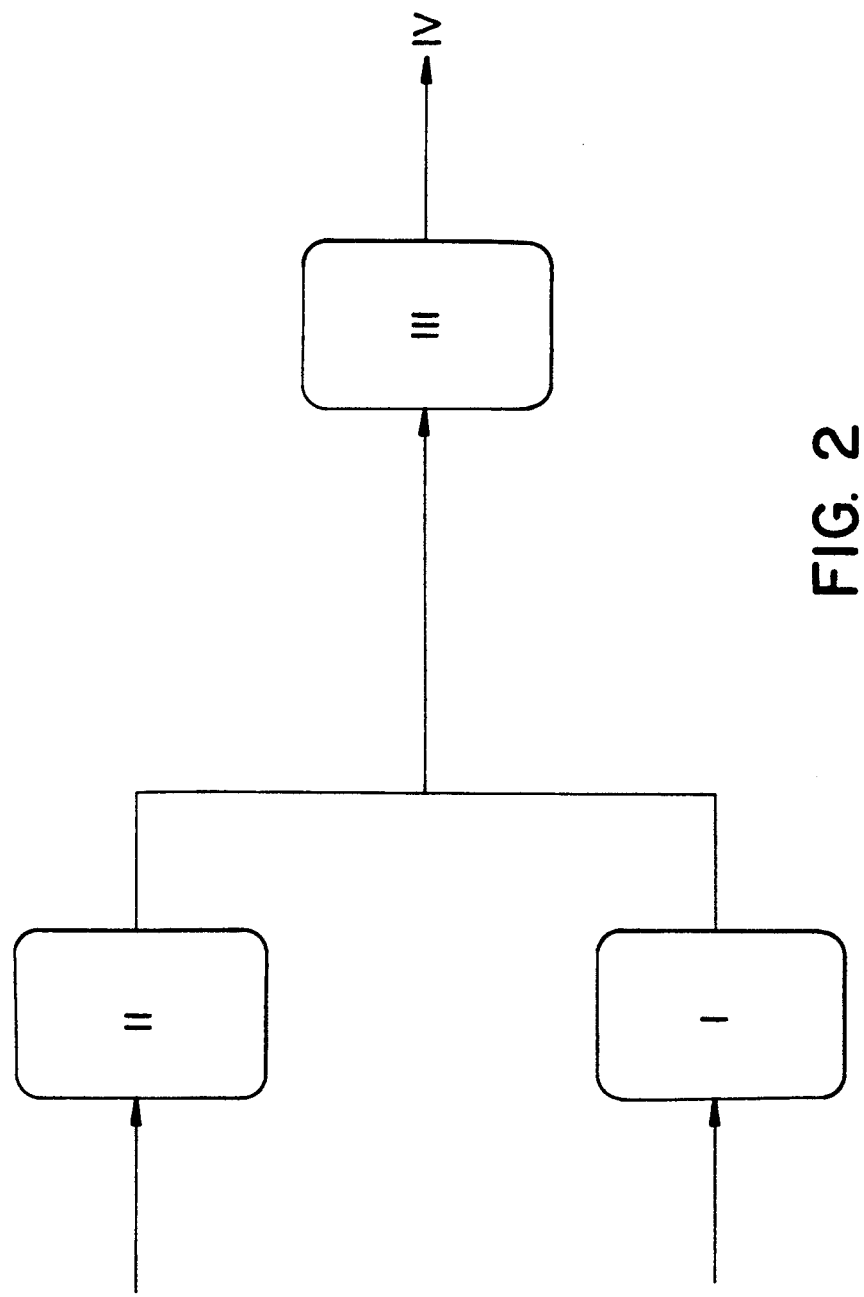
FIG. 2 shows a parallel reactor configuration for the polymerization of ethylene according to this invention.

The process of this invention is illustrated in FIG. 2. Reactor I, preferably a well-stirred, back-mixed tank reactor, is charged with a mixture of ethylene, solvent, catalyst, comonomer, and optionally, hydrogen. Reactor II, also preferably a well-stirred back-mixed tank reactor, is charged with a mixture of ethylene, solvent, catalyst and optionally hydrogen. The reactions streams from the two reactors are combined into a single reaction stream which is sent to Reactor III. The output of Reactor III goes to stage 4, that is, product recovery. The product can be recovered by any of the methods well-known to those skilled in the art. In Reactor I, all of the comonomer is introduced along with a portion of the ethylene to be used in the process. If desired, molecular weight can be controlled through the addition of hydrogen. The polymerization is conducted in the presence of a Ziegler-Natta type catalyst and the product of this reaction stream is a copolymer.

In Reactor II, ethylene, in the absence of comonomer, is polymerized, in solution, in the presence of a Ziegler-Natta catalyst. This particular reaction stream produces a homopolymer because all the comonomers are added to the first reaction stream. Reactor II is at a higher temperature than Reactor I.

Finally, the products of the first two reactors are mixed in Reactor III where some additional polymerization occurs. Since no further reactants or catalysts are added to the reaction when the first two streams are mixed in the third reactor, unreacted ethylene and comonomers from the first two streams continues to polymerize in the third reactor.

The benefits of the present invention will be realized in any practical copolymerization process in which all the comonomer is polymerized in a reaction stream parallel to a pure ethylene polymerization stream. However, the best results are achieved within a moderately narrow range of reaction conditions set forth more fully below.

Saturated hydrocarbons are suitable solvents for the present reaction. It is desirable that the solvent have a boiling point above about 30° C. Solvents of lower boiling point create too high a pressure when used in the present process. On the other hand, it is also desirable that the boiling point of the solvent not exceed about 150° C. Solvents that have a higher boiling point are more difficult to remove at the end of the process. Suitable solvents include all isomers of pentane, hexane, heptane, and octane, including the cyclic isomers. Hexane or cyclohexane are the preferred solvents.

The first, second, and third reactors are run under different conditions in order to achieve products of the desired molecular weight. The process of this invention is generally conducted so that, to the extent practical, the heat generated during the reaction is retained in the reaction (i.e., the reaction is run adiabatically). When run this way, the temperature of the third reactor is higher than the other two reactors. In addition, the third reactor should be a tubular reactor and the temperature of the third reactor will vary along the length of the tube. In order to assure that comonomer incorporation into the low molecular weight polymers produced at the warmest portion of the tubular reactor is minimized, it is desirable to have a moderate quantity of unreacted ethylene, such as about 0.25 to about 5 wt %, in the final reaction product.

Chain transfer agents such as hydrogen can optionally be used to control the molecular weight of the product produced in any of the three reactors. The proportion of hydrogen used in any reactor can be varied. For example, if less hydrogen is used in a reactor, a higher molecular weight polymer will be produced. However, the use of hydrogen in the first reactor stream is generally not preferred. Hydrogen can be introduced into the second reactor in order to control the molecular weight of that fraction. By varying the concentration of chain transfer agent, as well as the temperature, the present invention can be used to form polymers having widely different average molecular weights, and having molecular weight distributions ranging from relatively narrow to rather broad.

In the preferred embodiment, the reactions in the various reactors are run in a manner such that the highest molecular weight polymer is produced in the first reactor. This is advantageous because the effect of the comonomer on the properties of the polymer is greatest when the comonomer is preferentially incorporated into the higher molecular weight chains.

The mixture introduced into the first reactor has an ethylene/comonomer(s) weight ratio between about 0.5 and 50; the preferred ratio is between about 2 and 10. The first step of this process is run at a relatively high conversion of ethylene to polymer of 70 to 95 wt, and preferably 80 to 90 wt %, to incorporate a significant amount of comonomer. Accordingly, the product of this step of the reaction is a mixture that contains unreacted ethylene and olefin comonomer(s), polyethylene/comonomer chains, and an active catalyst. The process is run in a manner such that between about 5 and about 60 wt % (and preferably about 35 to about 40 wt %) of total polymer produced in the entire process is formed in this step. It is preferred that this first stream be polymerized at a temperature between about 125° and about 240° C. As is known to those skilled in the art, the temperature in the reactor can be controlled by adjusting the feed temperature, the ethylene concentration in the solution, and the catalyst concentration.

In the second parallel reactor, a solution of ethylene without comonomers is polymerized in the presence of a Ziegler-Natta catalyst. The process is run in a manner such that between about 20 and about 60 wt % (and preferably about 35 to about 40 wt %) of the total polymer produced in the entire process is formed in this step. This step produces a mixture that contains polyethylene, residual unreacted ethylene, and active catalyst. The polymerization in the second reactor is conducted at a temperature of about 180° to about 280° C. As in the case of the first reactor, the temperature can be controlled by adjusting the feed temperature, the ethylene concentration in the solvent, and the catalyst concentration. Although the temperature ranges of the two reactors overlap and it is possible to run each reaction stream at any temperature throughout its range, it is preferred to have the first reactor run at a temperature lower than that of the second, preferably below about 200° C.

The third reactor is a plug-flow tubular reactor (also called a non-back-mixed tubular reactor). A tubular reactor is required because it is possible to run such a reactor to incorporate less of the comonomer during the third stage of the reaction at any given ethylene conversion than with a stirred-tank back-mixed reactor. It is desirable, in order to achieve the purposes of the invention, to run the reaction so that less than 100% conversion of the ethylene is achieved. The unreacted ethylene and comonomer can then be readily recycled to said first reactor. Since the catalysts are still active, ethylen and comonomer(s) react to form additional copolymer. Usually between about 5 and about 30 wt % of the polymer produced in the entire process is produced in the third reactor. The reaction in this reactor is conducted at an outlet temperature of about 240° to about 320° C.; a preferred range is about 265° to about 300° C.

Polyethylene from the first reactor is a high molecular weight fraction that is rich in comonomer(s). The polyethylene from the second step contains no comonomer. Since all of the comonomer to be used in forming the polymer is added with only part of the ethylene, the first step of the process has a higher ratio of comonomer to ethylene than would be the case if all the ethylene and comonomer(s) were mixed together. Accordingly, even though the comonomer(s) polymerizes more slowly than ethylene, the higher concentration of comonomer assures that a substantial percentage of the comonomer(s) is incorporated into chains formed during this first reaction step.

Referring to FIG. 3, the polymer blend product of this invention has three fractions. Fraction 1, made in the first reactor is a copolymer of high molecular weight, with a melt index (MI) less than 1.0. Fraction 2, made in the second reactor, is a homopolymer of medium molecular weight, with an MI from about 1 to about 15. Fraction 3, made in the third reactor, is a low molecular weight fraction, with an MI from about 5 to about 50.

Example 1

This example uses the configuration of FIG. 2. To Reactor I was charged continuously 127,058 lbs/hr of hexane solvent containing 15 wt % ethylene and 2 wt % octene (the ethylene/comonomer weight ratio equalled 7.5 in this reactor) with sufficient catalyst (mixture of TiCl$_4$, VOC$_3$ and aluminum triethyl) to maintain a temperature at 220° C. The residence time was 2.0 minutes.

To Reactor II in parallel with Reactor I was charged 92,902 lbs/hr solvent containing 22.5 wt % ethylene and 36 ppm hydrogen. Catalyst was added to maintain the temperature at 257° C. The residence time was 1.4 minutes. Exit streams from Reactors I and II were combined and fed to Reactor III. The overall ethylene comonomer ratio was 15.7. The exit temperature of Reactor III was 265° C. and the residence time was 0.89 minutes. Properties of the polymer are given in Table I.

Example 2

The procedure used in Example I was followed except that flows were 90,000 lbs/hr solvent to Reactor I containing 10 wt % ethylene and 2 wt % octene (the ethylene/comonomer ratio equalled 5 in this reactor) and 129,921 lbs/hr to Reactor II containing 23.8% ethylene and 17.8 ppm hydrogen. Conditions for Reactor I were 178° C. and 2.2 minutes residence time. Conditions for Reactor II were 261° C. and 1.5 minutes residence time. The overall ethylene/comonomer weight ratio was 22.2. Reactor III had an exit temperature of 266° C. with a residence time of 0.89 minutes. Results are given in Table I.

Example 3

Flow rates, temperatures, and residence times were identical to Example 2, except that the octene concentration in the feed to Reactor I was 2.2 wt % (the ethylene/comonomer weight ratio equalled 2.5 in this reactor). The overall ethylene/comonomer weight ratio was 0.2. Results are given in Table I.

Example 4

Flow rates and residence times were identical to Examples 2 and 3. The octene concentration in the feed to Reactor I was increased to 3.5 wt % (the ethylene/comonomer weight ratio equalled 2.86 in this reactor). The overall ethylene/comonomer weight ratio was 12.7. Hydrogen to Reactor I was 3.2 ppm and 35 ppm to Reactor II. The temperature of Reactor I was 177° C., Reactor II 261° C., and Reactor III 264° C. (exit temperature). Results are given in Table I.

Comparative Example

Figure 1:
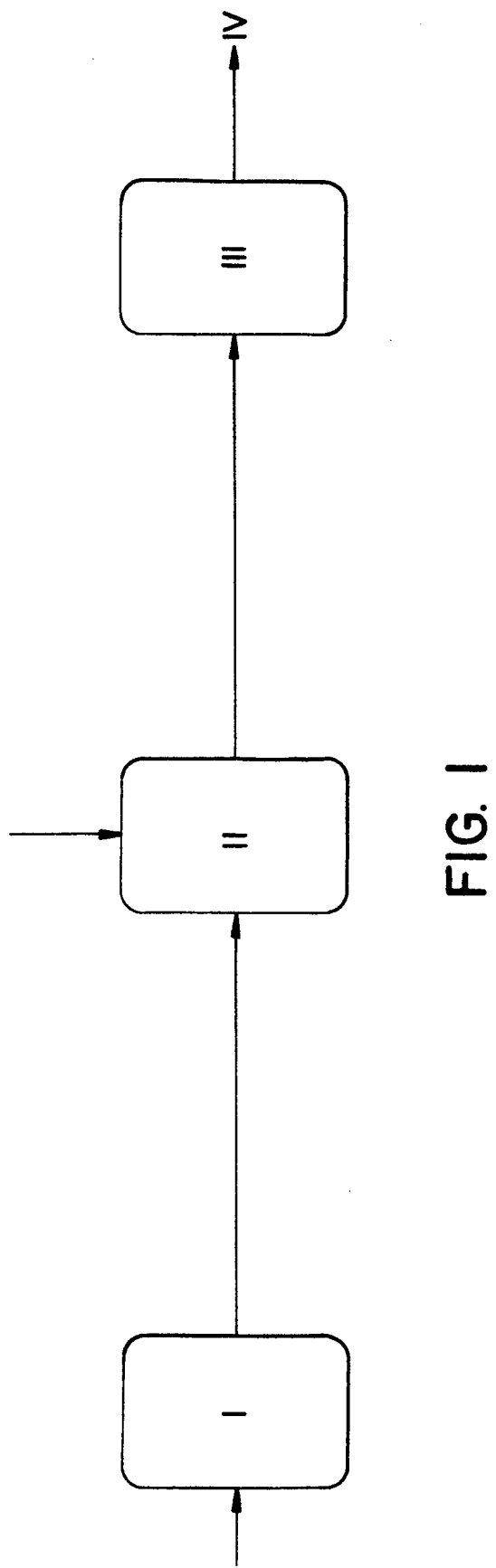
FIG. 1 illustrates a prior art series configuration of reactors for the polymerization of ethylene. Ethylene, solvent, catalyst, and comonomer and possibly hydrogen are charged into Reactor I. The output of Reactor I goes directly to Reactor II where further ethylene solvent catalyst comonomer and possibly hydrogen are added. The output of Reactor II goes to Reactor III and the output of Reactor III goes to stage 4, that is, the product recovery system.

This example used the configuration of FIG. 1. The feed to Reactor I was 149,868 lbs/hr solvent containing 24.2 wt % ethylene, 2.3 wt % octene, and 6 ppm hydrogen. The residence time was 1.3 minutes and the temperature was 240° C. The overall ethylene/comonomer weight ratio equalled 10.3.

The exit from Reactor I and an additional 46,400 lbs/hr solvent containing 3 wt % octene were fed to Reactor II. Reactor II was maintained at 240° C. with a residence time of 0.99 minutes. Results are given in Table I.

TABLE I

| | Melt Index | Density | ESCR* (hrs) | Octene Content of Polymer (wt %) |
|---|---|---|---|---|
| Example 1 | 6.5 | 0.9527 | 7.5 | 0.38 |
| Example 2 | 6.9 | 0.9508 | 5.6 | 0.25 |
| Example 3 | 6.7 | 0.9527 | 5.4 | 0.30 |
| Example 4 | 7.1 | 0.9538 | 4.5 | 0.30 |
| Comparative Example | 6.9 | 0.9542 | 3.1 | 0.80 |

*F(50) value for Environmental Stress Crack Resistance

From Table I, advantages of parallel operation (A) are less octene consumption for a target density and better polymer properties (higher ESCR).

We claim:

1. A solution polymerization process for producing a blend of polyethylene and copolymers of ethylene and at least one α-olefin having three to twelve carbon atoms comprising:
(A) in a first reactor, contacting ethylene and at least one α-olefin having three to twelve carbon atoms with a catalyst adopted for the polymerization thereof;
(B) effecting the polymerization of a portion of the olefins in the first reactor at a temperature between about 125° and about 240° C. in a manner such that a copolymer of ethylene and at least one α-olefin having three to twelve carbon atoms is formed in admixture with said catalyst;
(C) in a second reactor, parallel to said first reactor, contacting ethylene with a catalyst adopted for the polymerization thereof;
(D) effecting the polymerization of a portion of the olefins in said second reactor at a temperature of about 180° to about 280° C. in a manner such that a homopolymer of ethylene is formed in admixture with said catalyst;
(E) admixing the mixture from stop (B) with the mixture from step (D) in a third reactor; and
(F) effecting the polymerization of olefins from said first and second reactors in the third reactor at a temperature of about 240° to about 320° C., where said process is adiabatic and the temperature in said third reactor is higher than the temperature in said first and second reactors, and where the polymerizations are effected so that the polymer produced in said first reactor has a higher molecular weight than the polymers produced in said second and third reactors.

2. A process according to claim 1 wherein the quantity of monomer converted to polymer in said first reactor is between 70 and 95 wt % of the monomer introduced into said first reactor.

3. A process according to claim 2 wherein the quantity of monomer converted to polymer in said first reactor is between 80 and 90 wt % of the monomer introduced into said first reactor.

4. A process according to claim 1 wherein said third reactor is a non-back-mixed tubular reactor.

5. A process according to claim 1 wherein the polymerization temperature in said first reactor is less than 200° C.

6. A process according to claim 1 wherein the weight ratio of ethylene to α-olefin in said first reactor is 0.5 to 50.

7. A process according to claim 1 wherein a chain transfer agent is introduced into said second reactor to control the molecular weight of said homopolymer.

8. A process according to claim 7 wherein said chain transfer agent is hydrogen.

9. A process according to claim 1 wherein said polymerizations in said first, second, and third reactors are performed in a saturated hydrocarbon solvent having a boiling point between 30° and 150° C.

10. A process according to claim 9 wherein said solvent is hexane or cyclohexane.

11. A process according to claim 1 wherein said polymerization in said first, second, and third reactors are performed so that the final product contains about 0.25 to about 5 wt % unreacted ethylene.

12. A process according to claim 11 wherein said unreacted ethylene is recycled to said first reactor.

13. A process according to claim 1 wherein said copolymer has a melt index less than 1.0, said homopolymer has a melt index of about 1 to about 15, and the polymer produced in said third reactor has a melt index of about 5 to about 50.

14. A solution polymerization process for producing a blend of polyethylene and copolymers of ethylene and at least one α-olefin having three to twelve carbon atoms comprising:
(A) in a first reactor, copolymerizing ethylene with at least one α-olefin containing three to twelve carbon atoms, in a saturated hydrocarbon solvent having a boiling point between 30° and 150° C., in the presence of a suitable polymerization catalyst, at a temperature of between about 125° and about 240° C.;
(B) in a second reactor, separately polymerizing ethylene in said hydrocarbon solvent, in the presence of a suitable polymerization catalyst, at a temperature of about 180° to about 280° C., to produce a homopolymer of ethylene;
(C) combining the products of steps (A) and (B) in a plug-flow tubular third reactor; and
(D) polymerizing olefins in said third reactor at a temperature of about 265° to about 300° C., where the temperature in said third reactor is higher than the temperature in said first and second reactors, where the polymerizations are effected adiabatically and so that the polymer produced in said first reactor has a higher molecular weight than the polymers produced in said second and third reactors, and where about 5 to about 60 wt % of the total polymer produced is formed in said first reactor, about 20 to about 60 wt % of the total polymer produced is formed in said second reactor, and the remainder of said polymer produced is formed in said third reactor.

15. A process according to claim 14 wherein the quantity of monomer converted to polymer in the first reactor is between 70 and 95 wt % of the monomer introduced to said first reactor.

16. A process according to claim 14 wherein the weight ratio of ethylene to α-olefin in said first reactor is 0.5 to 50.

17. A process according to claim 14 wherein a chain transfer agent is introduced into said second reactor to control the molecular weight of said homopolymer.

18. A process according to claim 17 wherein said chain transfer agent is hydrogen.

19. A process according to claim 14 wherein said solvent is hexane or cyclohexane.

20. A solution polymerization process for producing a blend of polyethylene and copolymers of ethylene and at least on α-olefin having three to twelve carbon atoms comprising:
(A) in a well-stirred, back-mixed tank first reactor, copolymerizing ethylene with at least one α-olefin having three to twelve carbon atoms, in hexane or cyclohexane, in the presence of a suitable polymerization catalyst, at a temperature of between about 125° and about 200° C., whereby 70 to 95 wt % of said ethylene and α-olefin is converted into polymer;
(B) in a well-stirred, back-mixed tank second reactor, separately polymerizing ethylene in said hydrocarbon solvent, in the presence of a suitable polymerization catalyst, at a temperature of about 180° and about 280° C., to produce a homopolymer of ethylene;
(C) combining the products of steps (A) and (B) in a plug-flow tubular third reactor; and (D) polymerizing olefins in said third reactor at a temperature of about 265° to about 320° C., where the temperature in said second reactor is higher than the temperature in said first reactor and the temperature in said third reactor is higher than the temperature in said second reactor, the polymerizations are effected adiabatically and so that the polymer produced in said first reactor has a higher molecular weight than the polymers produced in said second and third reactors, about 5 to about 60 wt % of the total polymer produced is formed in said first reactor, about 20 to about 60 wt % of the total polymer produced is formed in said second reactor, and the remainder of said polymer produced is formed in said third reactor, and said polymerizations in said first, second, and third reactors are performed so that the product of said third reactor contains about 0.25 to about 5 wt % unreacted ethylene; and (E) recycling said unreacted ethylene to said first reactor.

* * * * *